UNITED STATES PATENT OFFICE.

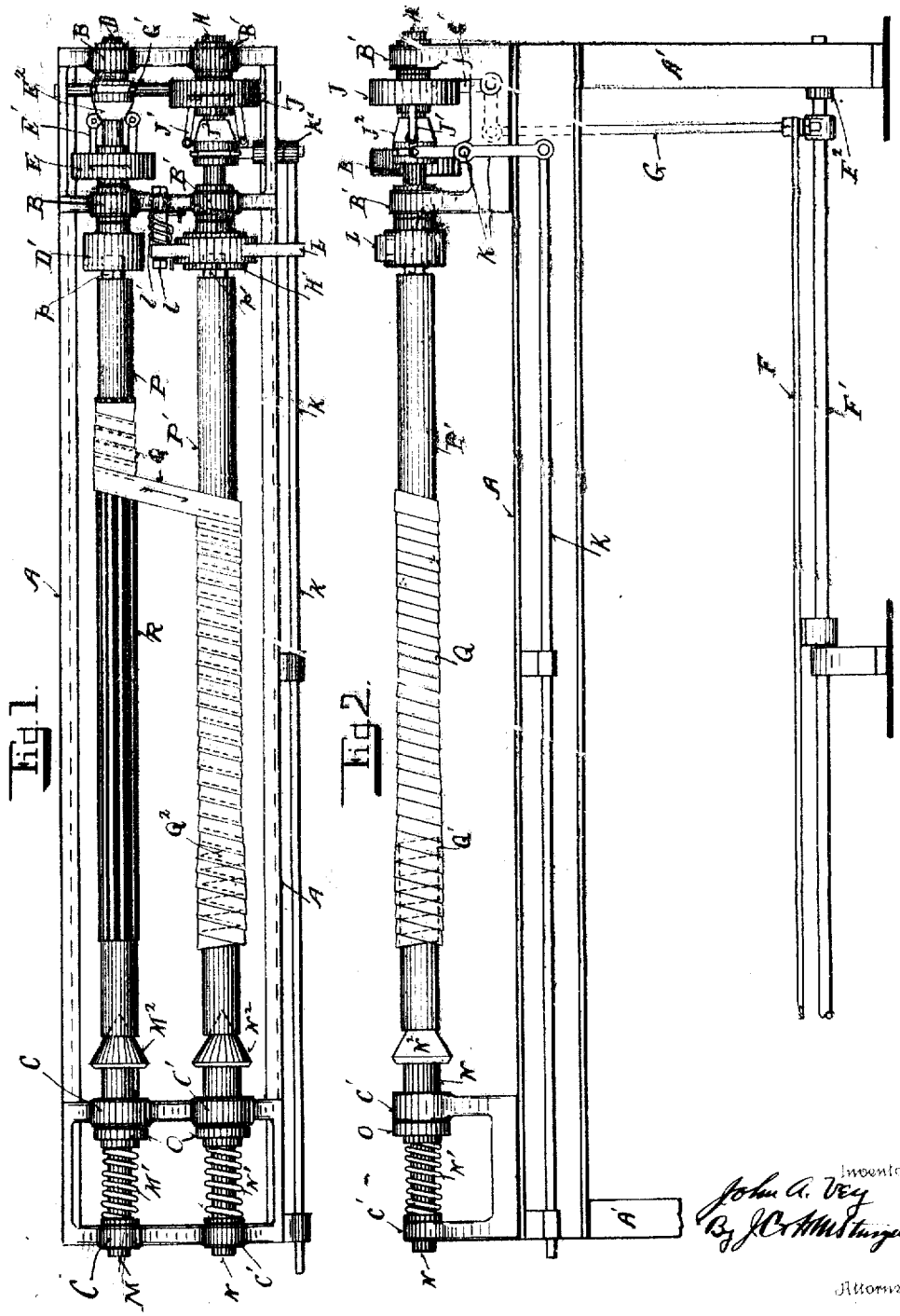

JOHN A. VEY, OF ERIE, PENNSYLVANIA, ASSIGNOR TO CONTINENTAL RUBBER WORKS, OF ERIE, PENNSYLVANIA, A CORPORATION OF PENNSYLVANIA.

TUBE-WRAPPING MACHINE.

1,204,213.  Specification of Letters Patent.  Patented Nov. 7, 1916.

Application filed April 1, 1916. Serial No. 88,325.

*To all whom it may concern:*

Be it known that I, JOHN A. VEY, a citizen of the United States, residing at Erie, in the county of Erie and State of Pennsylvania, have invented certain new and useful Improvements in Tube-Wrapping Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to tube wrapping machines and has for its object the construction of mechanism by means of which tape fabric may be wrapped around a tube to be vulcanized, and after the tube has been vulcanized, the said tape can be unwound from said tube and wound upon a pole, ready to be wound upon another tube.

In the manufacture of rubber inner tubes for vehicle tires, the unvulcanized gum is first formed into tubes, which unvulcanized gum tubes are placed upon "poles", usually metal pipe; and then the unvulcanized tube is tightly wrapped with strips of muslin or tape, in spiral form, after which the pole with the wrapped unvulcanized tube thereon, is placed in the vulcanizer to be cured. When the pole with the cured rubber tube thereon is removed from the vulcanizer, the wrapping tape is removed therefrom, and according to present practice, is rewound upon a spool by hand work or otherwise, as the case may be.

With my improved wrapping machine herein described, the pole with the cured rubber tube thereon, after being removed from the vulcanizer is replaced in my wrapping machine, together with a pole without a tube thereon, and the tape is unwound from the cured rubber tube onto the empty pole, in the same spiral form in which it was wrapped around the cured rubber tube; so that when the cured tube has been unwrapped another pole with an unvulcanized gum tube thereon, can be placed in the machine and the wrapping tape wound upon said unvulcanized gum tube in the same form as in the case of the first tube; thus eliminating the necessity of winding the wrapping tape upon a spool prior to the wrapping of a tube, and the necessity of guiding the tape in the proper spiral during the wrapping of the tube.

These and other features of my invention will appear hereinafter in the specification and claims, and are illustrated in the accompanying drawings, in which:—

Figure 1, is a plan view of mechanism embodying my invention. Fig. 2, is a front elevation of the same, with a portion thereof broken away.

In these drawings A, indicates the frame of the machine, and A', indicates the supporting legs thereof. Upon one end of the frame A, I place shaft bearings B B and B' B', and on the opposite end of the frame I place bearings C C and C' C'.

In the bearings B B, I mount a shaft D, upon which is secured a chuck-head D', having a central squared opening in the flat face thereof; and upon the shaft D, between the bearings B B, I place a pulley E, provided with friction clutch mechanism E', and an operating cone E². This cone E², is preferably operated by means of a foot treadle F, and shaft F', which is supported in bearings F², in the legs A', from which treadle a rod G, extends upwardly to bell crank mechanism G', which engages the cone E². In the bearings B' B', I mount another shaft H, which is provided with a chuck H', having a square opening in the flat face thereof similar to the chuck D'. Upon the shaft H, I also place a pulley J, provided with friction clutch mechanism J', and operating cone J², which operating cone J², is controlled by means of a hand rod K, and lever and rock shaft mechanism ..; said rock shaft K', and bell crank mechanism G', being journaled in the frame of machine below the shafts D and H. I also provide a hand brake lever L, which is pivoted to the machine upon the pivot *l*, and is provided with a spring *l'*, adapted to normally maintain said lever out of contact with the periphery of the chuck H'.

In the bearings C, I place a slidable shaft M, provided with a spring M', adapted to maintain said shaft in the position thereof shown in the drawings, and upon one end of said shaft I place a cone-head M², adapted to project into the open end of a pipe; and in the bearings C', I place a like shaft N, provided with a spring N', to maintain said shaft in position thereof shown in the drawings, and on one end of said shaft I place a cone-head N². The shafts M and N, are also provided with collars O, which limit the forward movement thereof, so that they will not become displaced in the bearings C and C'.

The vulcanizing poles P and P', are placed upon the cones M² and N², with the squared ends thereof $p$ and $p'$, in the squared openings in the chucks D' and H'.

In operation the cone E², is withdrawn from the clutch mechanism E', as shown in Fig. 1, of the drawings, so that the pulley E, will run freely on the shaft D; the rotation of said pulley being in the direction of the arrow thereon; and the pole P, having thereon a rubber tube with its wrapping tape Q, as it comes from the vulcanizer, is put in place between the chuck D', and the cone M², and the free end of the tape, as indicated by the broken line Q', in Fig. 1, is unwound therefrom and placed around an empty pole P', supported by the chuck H', and cone N²; then the hand rod K, is operated to force the cone J², toward the pulley J, so as to operate the clutch mechanism in J, so as to cause the shaft H, to revolve. The direction of the revolution of the shaft H, and pulley J, being in the direction of the arrow thereon, is opposite to the rotation of the pulley E. This rotation of the shaft H, causes the empty pole P', to rotate and wind the tape Q, off of the cured tube R, and onto the pole P', with the same degree of spiral and overlap in which it was wound upon the cured tube R. During this unwinding of the tape Q, from the cured rubber tube R, the pole P, and the shaft D, rotate backward, opposite to the rotation of the pulley E, thereon.

When the tape Q, has been entirely unwound from the rubber tube R, the pole P, is replaced by another pole P, on which has been placed an unvulcanized rubber gum tube, and then the free end of the tape Q, on the pole P', is wound around the end of the unvulcanized rubber tube, the cone J², having been previously withdrawn from the clutch mechanism J'. Then the cone E², is caused to set the clutch mechanism E', in the pulley E, which causes the pole P, and green gum tube R, to rotate in the direction of the arrow on the pulley E, and wind the tape Q, thereonto, from the pole P'.

During the winding of the tape Q, upon the green gum tube R, sufficient pressure may be exerted by the operator, upon the brake L, to put the proper amount of tension upon the tape Q, as it is being wound upon the rubber gum tube R.

Having thus shown and described the mechanism embodying my invention, so as to enable others to utilize the same, I do not desire to limit myself to the exact construction shown and described, but

What I claim as new and desire to secure by Letters Patent, is:—

1. In a machine of the class described, a pair of poles, means to rotatably support the same in parallelism, said poles being adapted to receive a tape spirally wound thereon, and means to independently rotate said poles in opposite directions, whereby the tape is alternately and spirally wound from one to the other without traverse.

2. In a machine of the class described, means to rotatably support a tape bearing pole, means to rotatably support a tube bearing pole parallel with said tape bearing pole, said poles adapted to receive a tape spirally wound thereon, and means to independently rotate said poles in opposite directions whereby the tape is alternately wound from one to the other without traverse.

3. In a machine of the class described, a frame, a head-stock and tail-stock thereon, a pair of live spindles in said head-stock, a pair of dead spindles in said tail-stock, a spirally wound tape-bearing pole supported between a live and dead spindle, a brake mechanism associated with said live spindle, a tube-bearing pole supported between the other live and dead spindles, a pulley and associated clutch mechanism on each of said live spindles, whereby said poles may be rotated to spirally wind said tape from one to the other without traverse.

In testimony whereof I affix my signature.

JOHN A. VEY.